United States Patent
Blundell et al.

(10) Patent No.: US 10,533,685 B2
(45) Date of Patent: Jan. 14, 2020

(54) PIPE, HOSE, AND CABLE SUPPORT SYSTEM

(71) Applicants: Jordan N. Blundell, Pearland, TX (US); Landon W. Lochridge, Pearland, TX (US); Garrett D. Blundell, Pearland, TX (US); John C. Hall, Pearland, TX (US)

(72) Inventors: Jordan N. Blundell, Pearland, TX (US); Landon W. Lochridge, Pearland, TX (US); Garrett D. Blundell, Pearland, TX (US); John C. Hall, Pearland, TX (US)

(73) Assignee: HEXA CONTAINMENT, Pearland, TX (US)

( * ) Notice: Subject to any disclaimer, the term of this patent is extended or adjusted under 35 U.S.C. 154(b) by 0 days.

(21) Appl. No.: 15/464,889

(22) Filed: Mar. 21, 2017

(65) Prior Publication Data

US 2017/0268701 A1  Sep. 21, 2017

Related U.S. Application Data

(60) Provisional application No. 62/311,028, filed on Mar. 21, 2016.

(51) Int. Cl.
*F16L 3/00* (2006.01)
*F16L 3/02* (2006.01)
*F16B 5/00* (2006.01)
*F16M 11/24* (2006.01)

(52) U.S. Cl.
CPC .............. *F16L 3/02* (2013.01); *F16B 5/002* (2013.01); *F16M 11/24* (2013.01)

(58) Field of Classification Search
CPC ............ F16L 3/02; F16B 5/002; F16M 11/24
USPC .............. 248/49, 50, 56, 80, 83, 121, 440.1
See application file for complete search history.

(56) References Cited

U.S. PATENT DOCUMENTS

| | | | | |
|---|---|---|---|---|
| 2,648,931 A * | 8/1953 | Deveau | ............... | A47B 23/042 248/460 |
| 4,996,404 A * | 2/1991 | Skerker | ............... | H05B 6/6408 211/195 |
| 5,197,612 A * | 3/1993 | Thomson | ............ | A47B 73/004 211/74 |
| 5,516,072 A * | 5/1996 | Shinno | ............... | A47B 23/044 248/174 |
| 6,186,449 B1 * | 2/2001 | Chrestenson | ............ | F16L 3/26 248/49 |
| 6,488,252 B1 * | 12/2002 | Ibrahim | ............... | A47B 65/00 248/441.1 |

(Continued)

*Primary Examiner* — Gwendolyn W Baxter
(74) *Attorney, Agent, or Firm* — IPR Law Group PC (57) ABSTRACT

Embodiments include portable support systems configured to support structures, and corresponding methods. The portable support systems include two individual segments, pieces and/or panels that couple or combine and fit together to form the support systems. The support systems of embodiments are configured for the spanning and/or support of structures including pipes, hoses, and/or cables over structures, voids, and/or obstacles, thereby preventing dislodging and insufficient support of pipes, hoses, and/or cables from the support systems. The support systems of embodiments are configured to prevent improperly supported walls from collapse as a result of improper support of objects spanning the wall.

21 Claims, 11 Drawing Sheets

(56) References Cited

U.S. PATENT DOCUMENTS 7,434,771 B1 * 10/2008 Tai .......................... F16L 3/00
                                                       138/106

* cited by examiner

PIPE, HOSE, AND CABLE SUPPORT SYSTEM

RELATED APPLICATIONS

This application claims the benefit of U.S. Patent Application No. 62/311,028, filed Mar. 21, 2016.

TECHNICAL FIELD

Embodiments herein relate to support systems and, more particularly, portable support systems.

BACKGROUND

Portable secondary spill containment berms are traditionally used beneath industrial equipment to capture leaking solids and liquids that would otherwise contaminate the environment. It would be beneficial to consumers of spill containment berms to have a support system configured to span the flexible containment berm wall with different different pipes, hoses, and/or cables.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

DETAILED DESCRIPTION

Embodiments herein relate to portable support systems configured to support structures. More particularly, embodiments herein relate to pipe, hose, and/or cable portable support systems, and methods for using same, comprising two individual segments, pieces and/or panels that couple or combine and fit together thereby forming support systems. The support systems of embodiment are configured for the spanning and/or support of structures including pipes, hoses, and/or cables over structures, voids, and/or obstacles, thereby preventing dislodging and insufficient support of pipes, hoses, and/or cables from the support systems.

Portable secondary spill containment berms are traditionally used beneath or adjacent to industrial equipment and/or any component (e.g., pumps, generators, HVAC units, tanks, etc.) configured to transfer, contain and/or otherwise process or handle harmful substances that could impact the environment, as a means to capture any leaking substance or material (e.g., harmful material, leaking solids, liquids, etc.) that can otherwise impact or contaminate the environment. These portable containment berms generally comprise flooring and a surrounding wall, which is structurally supported in order to handle the hydrostatic forces of rising liquids. The flooring and wall are typically made of lightweight, flexible materials configured for ease of transportation and assembly. The equipment typically deployed inside of a containment berm will be coupled or connected to other components via pipes, hoses, and/or cables (including other pipes, hoses, and/or cables) positioned outside the containment walls. The conventional configuration for this scenario relies on the pipes, hoses, and/or cables laying upon or above the flexible containment wall in order to transport material (e.g., fluids, solids, data, electricity, etc.) within the pipes, hoses, and/or cables from the equipment to the components. However, the pipes, hoses, and/or cables often end up laying upon the flexible containment wall and as a result threaten the operational integrity of the berm by inadvertently providing a path for the contaminants contained within the containment wall to escape.

Embodiments described herein are configured to provide consumers of spill containment berms with a support system by which the flexible containment berm wall is spanned by an assortment of different structures like pipes, hoses, and cables, to name a few. The support system is configured to maintain operational integrity of the berm including the berm wall. The support system comprises a light weight material(s) and is low profile while simultaneously being sufficiently stable so as to accommodate the movements and vibrations associated with the flow of, for example, fluids through these pipes, hoses, and cables, or associated with adjustments made to the pipes, hoses, and cables, and rigid enough to uphold the weight of the pipes, hoses, and cables and any material transported within these structures. The support system can be configured to accommodate many different types of pipes, hoses, and/or cables of varying weight and diameter, which may be supported in such a manner that does not allow for dislodging from the support system.

Embodiments of the support system include two individual segments, pieces, and/or panels configured to be fitted or used together to provide a support system by which pipes, hoses, and/or cables may traverse over a wall of a secondary containment berm without compromising the structural or operational integrity of the berm. The individual panels of an embodiment are similar or substantially identical, but are not so limited. In an embodiment, the support system comprises two rugged, identical, and lightweight substantially rectangular panels. Each panel includes a slot by which the other panel may slide as described in detail herein. In operation, these two slots are aligned, slid through each other, and slid ultimately onto the other panel, until the slots reach their respective ends, thereby providing a final, locked support system assembled in a cross- or X-configuration.

The support system is configured for a wide assortment of different pipes, hoses, and/or cables of varying diameters and weights to be supported in a configuration including one or more of parallel, perpendicular, and at another angle with respect to the containment berm wall and at a height which does not compromise the operation of the berm or the pipes, hoses, and cables. Alternatively, several support systems can be used together (e.g., placed in series, etc.) so that a pipe, hose or cable may run along long wall lengths in a parallel fashion or over several separate berm walls in a perpendicular or angled fashion.

The configuration of the base of the assembled support system mitigates or eliminates the threat of the support system overturning and consequently falling onto and collapsing the berm wall. The support system of an embodiment comprises multiple "through-drilled" holes configured for different types of securement devices such as bungee cords, ropes, cables, or wires to be secured over the pipe, hose, and/or cable supported by the support system, thereby securing the pipe, hose, and/or cable to the support system. Thus, the securement device stabilizes and prevents movement of the pipe, hose, or cable from the movements and vibrations associated with fluid transfer and assures that the pipe, hose, or cable does not become dislodged from the support system thereby ultimately protecting the operational integrity of the berm.

In an embodiment, when the support system is disassembled/disconnected, or not in the X-configuration, the two pieces may be held together by placing a strap, cord or rope through the ergonomically designed handles or the through-drilled holes of each panel, thereby fastening the panels together for, for example, storage or transport purposes.

In an embodiment, two substantially identical panels that define a particular support system do not need to be specifically "mated" or earmarked to each other. In other words, all support bridge panels from multiple support systems may be interchangeable, but embodiments are not so limited.

In an embodiment, individual pieces of the support system are configured to be placed face down on the ground in order to provide a support pad, on top of which panels comprising other assembled support systems may be placed in order to increase the surface area over which the weight of the support systems and the supported pipe, hose, or cable are dispersed. This application may be beneficial in, for example, snow and rain-driven ground conditions.

In an embodiment, individual pieces of the support system are configured to be placed (e.g., wedged, etc.) beneath a wheel of sorts in order to provide a small ramp by which a stuck vehicle may be able to become dislodged. Additionally, the individual pieces of the hose bridge are configured to be used as "chocks" beneath the tires of different wheeled vehicles and equipment.

Figure 1A:
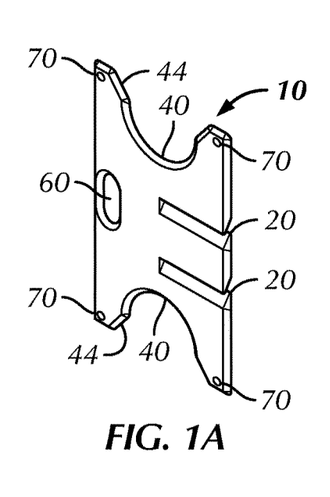
FIG. 1A is a perspective view schematic diagram illustrating an embodiment of a panel for a support system, under an embodiment.
Figure 1B:
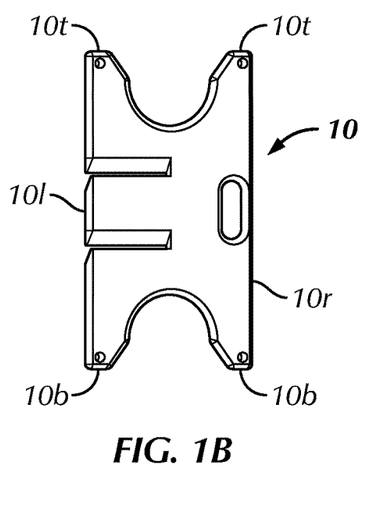
FIG. 1B is a slightly perspective view schematic diagram of the panel shown in FIG. 1A, under an embodiment.
Figure 1C:
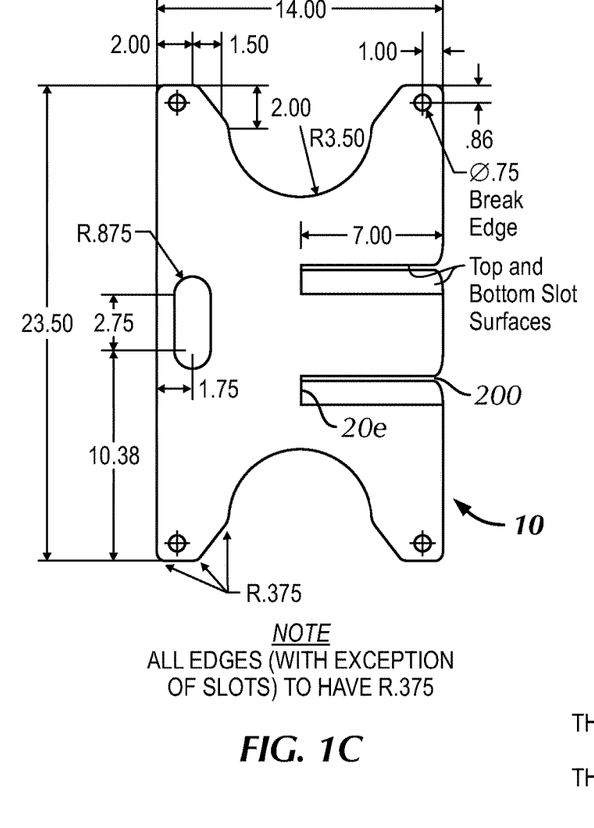
FIG. 1C is a front view schematic diagram of the panel shown in FIG. 1A, under an embodiment.
Figure 1D:
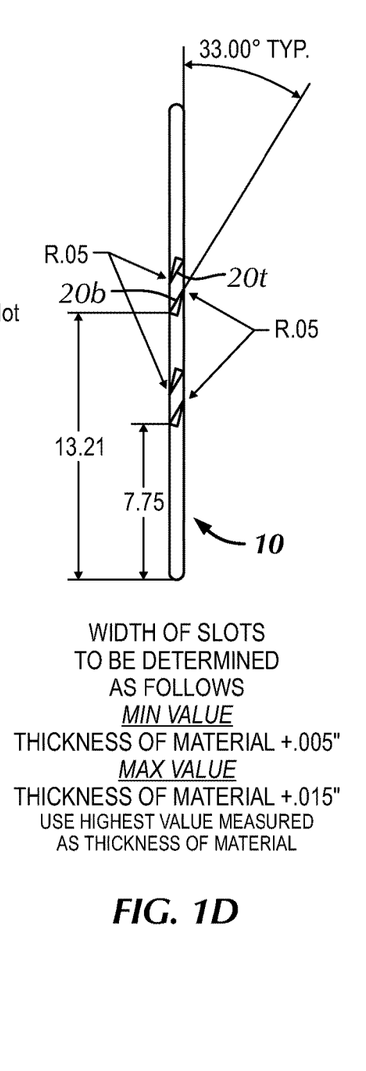
FIG. 1D is a side view schematic diagram of the panel shown in FIG. 1A, under an embodiment.

FIG. 1A is a perspective view schematic diagram illustrating an embodiment of a panel 10 for a support system, under an embodiment. FIG. 1B is a slightly perspective view schematic diagram of the panel 10 shown in FIG. 1A, under an embodiment. FIG. 1C is a front view schematic diagram of the panel 10 shown in FIG. 1A, under an embodiment. FIG. 1D is a side view schematic diagram of the panel 10 shown in FIG. 1A, under an embodiment. The panels shown in FIG. 1A-1D are generally rectangular in shape, but are not limited to this shape and could include any shape as appropriate to the support system configurations described herein. Likewise, the various shapes, angles, and/or dimensions described herein are provided as examples, but embodiments are not limited to the shapes, angles, and/or dimensions given and could include any shapes, angles, and/or dimensions as appropriate to the support system configurations described herein.

With reference to FIGS. 1A-1D, panel 10 includes two slots 20, two recesses 40, hole 60, and four through-holes 70. The panel 10 is configured to be of a sufficient depth/thickness suitable for providing support having sufficient sturdiness and stability with little or no flexibility when assembled with another panel in an X-configuration support system. The thickness may be dependent on the size and weight of the pipe, hose, or cable and material carried by the pipe, hose, or cable, which are to be supported by the support system. An example thickness of panel 10 is within the range of 0.4 and 1.0 inch, for example approximately 0.75 inch, but is not so limited to a dimension within this range. An exemplary width of panel 10 is within the range of 11.0 and 18.0 inches, for example approximately 14.0 inches, but is not so limited to a dimension within this range. An exemplary height of panel 10 is within the range of 20.0 and 27.0 inches, for example approximately 23.5 inches, but is not so limited to a dimension within this range. Each recess 40 is configured to include a surface having a radius of curvature in the range of 2.0 and 5.0 inches, and preferably approximately 3.5 inches, but is not so limited to a dimension within this range.

Each slot is configured to include a length measured from a slot opening 200 (see FIG. 1C) positioned at a left edge 10*l* or right edge 10*r* (see FIG. 1B) of the panel and extending toward a slot end 20*e* in the direction of a central portion of the panel. An exemplary slot length is within the range of 5.0 and 9.0 inches, for example approximately 7.0 inches. The slot end 20*e* of an embodiment is located at the center/middle of the panel between the left edge 10*l* and the right edge 10*r*, but is not so limited. Alternatively, the slot length may be shorter or longer.

Each slot 20 is bound by a top slot surface 20*t* and a bottom slot surface 20*b* (see FIG. 1D). Either or both of the top and bottom slot surfaces may be angled to substantially match the angle of the panels with respect to each other, when the panels are coupled in the assembled X-configuration. The angled top and bottom slot surfaces extend the entire length of each slot 20.

The minimum thickness of the slot may be calculated by the sum of the panel thickness plus an amount in the range of 0.002 and 0.008 inch, for example 0.005 inch. The maximum thickness of the slot may be calculated by the sum of the panel thickness plus an amount in the range of 0.012 and 0.018 inch, and preferably 0.015 inch.

Alternatively, the minimum thickness of the slot may be calculated by the sum of the panel thickness plus a percentage of the panel thickness in the range of 0.30 and 0.97 percent, for example 0.67 percent. The maximum thickness of the slot may be calculated by the sum of the panel thickness plus a percentage of the panel thickness in the range of 1.60 and 2.40 percent, for example 2.00 percent.

The angle(s) of the angled top slot surface and/or angled bottom slot surface, and/or the thickness of the slots are selected such that the panels held within the slots are locked in place without sagging and without movement, when the panels are coupled in the X-configuration.

The panel of an embodiment includes (optional) a hole 60 which may be used for carrying each panel (e.g., hand carry, other carry mechanism, etc.) when separated and not part of an assembled support system. See also FIG. 9, which shows hole 360 in panel 310. The hole 60, 360 may also be configured for receiving and/or attaching a securement device such as a bungee, cable, cord, etc., around a pipe, hose, or cable such to thereby secure the pipe, hose, or cable to the support system when two plate are assembled in an X-configuration. The hole 60, 360 may be used instead of or in addition to through-holes 70 which may be used for the same purpose. The hole 60, 360 may be of any suitable size or shape.

The panel of an embodiment includes (optional) an angled or convex notch 44 (see FIG. 1A) formed between each recess 40 and a top edge 10t of the panel 10 and configured for easing a pipe into place within the recess 40 without any sharp edges between the recess 40 and the top edge 10t which would otherwise be present without the notch 44. The notch 44 can be of any suitable size or shape.

Figure 2:
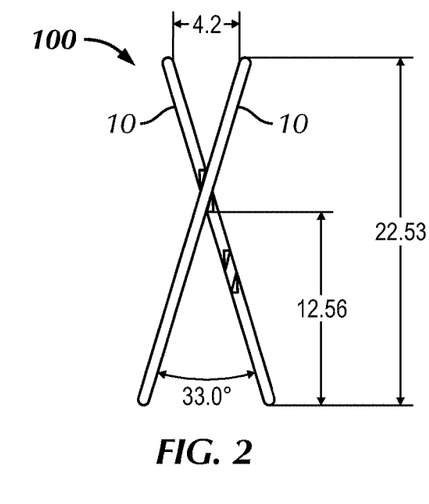
FIG. 2 is a side view schematic diagram illustrating an embodiment of an assembled support system comprising panels of the type shown in FIG. 1A, under an embodiment.

FIG. 2 is a side view schematic diagram illustrating an embodiment of an assembled support system 100 comprising two substantially identical panels 10 of the type shown in FIG. 1A, under an embodiment.

Figure 3A:
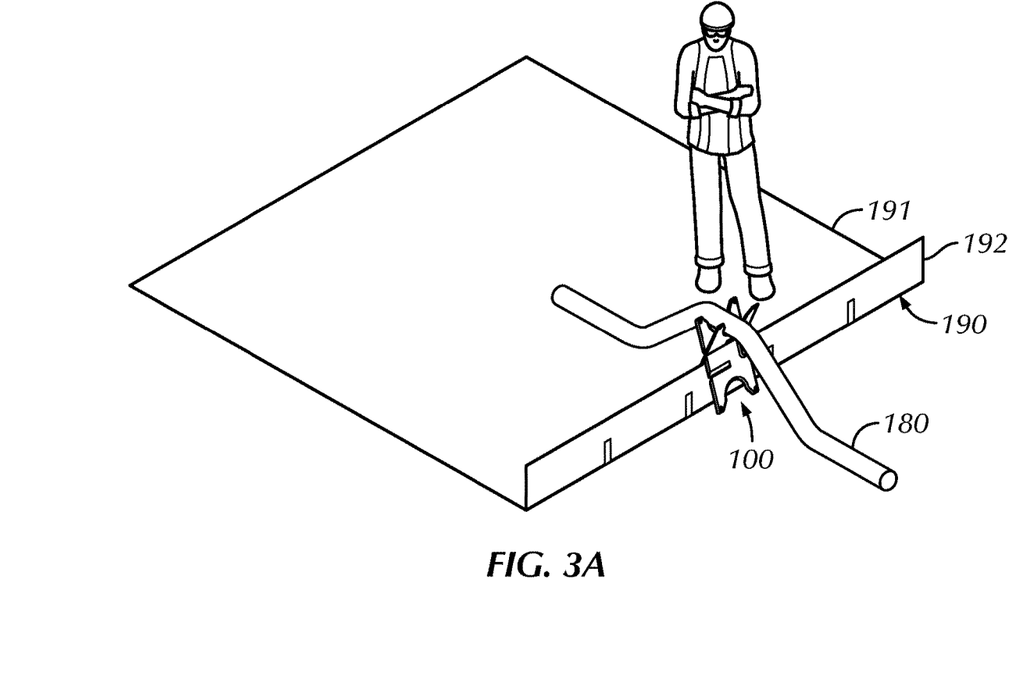
FIG. 3A is a perspective view schematic diagram of the assembled support system shown in FIG. 2 in use with a pipe and a containment berm, under an embodiment.

FIG. 3A is a perspective view schematic diagram of the assembled support system 100 shown in FIG. 2 in use with a pipe 180 and a containment berm 190, under an embodiment. The containment berm 190 comprises a floor 191 and wall 192.

Figure 3B:
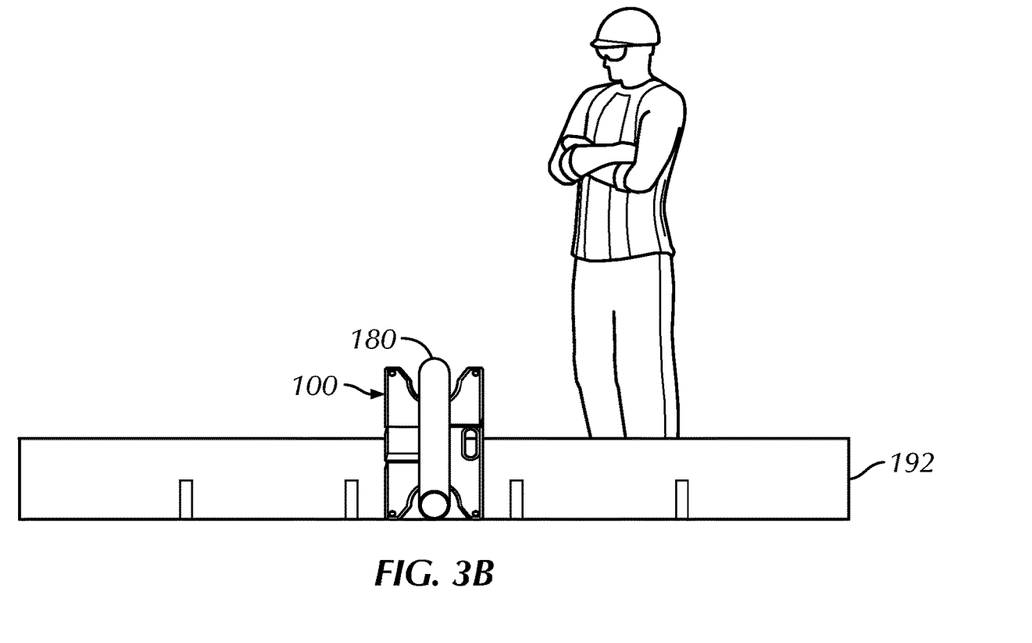
FIG. 3B is a front view schematic diagram of the assembled support system, pipe, and containment berm shown in FIG. 3A, under an embodiment.

FIG. 3B is a front view schematic diagram of the assembled support system 100, pipe 180, and containment berm 190 shown in FIG. 3A, under an embodiment.

Figure 3C:
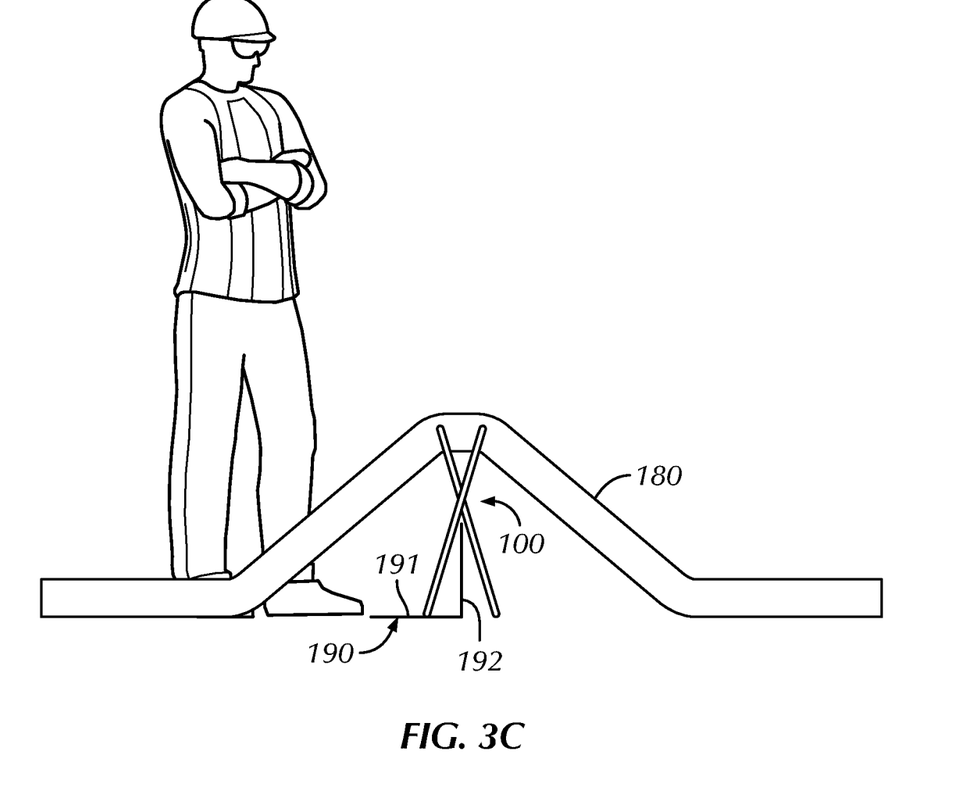
FIG. 3C is a side view schematic diagram of the assembled support system, pipe, and containment berm shown in FIG. 3A, under an embodiment.

FIG. 3C is a side view schematic diagram of the assembled support system 100, pipe 180, and containment berm 190 shown in FIG. 3A, under an embodiment.

Figure 4:
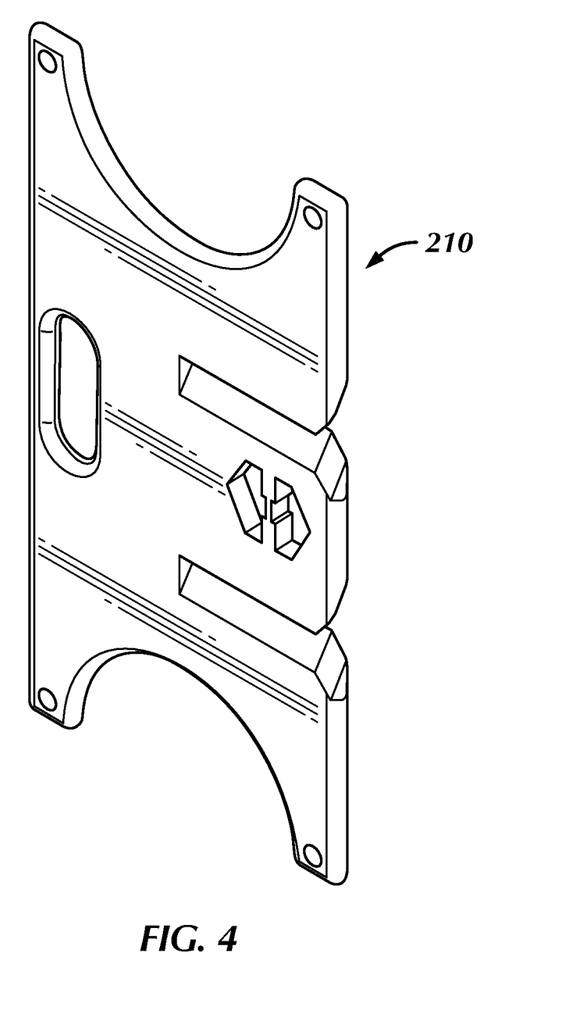
FIG. 4 is a perspective view schematic diagram illustrating an embodiment of a panel for a support system, under an embodiment.

FIG. 4 is a perspective view schematic diagram illustrating an embodiment of a panel 210 for a support system, under an embodiment.

Figure 5:
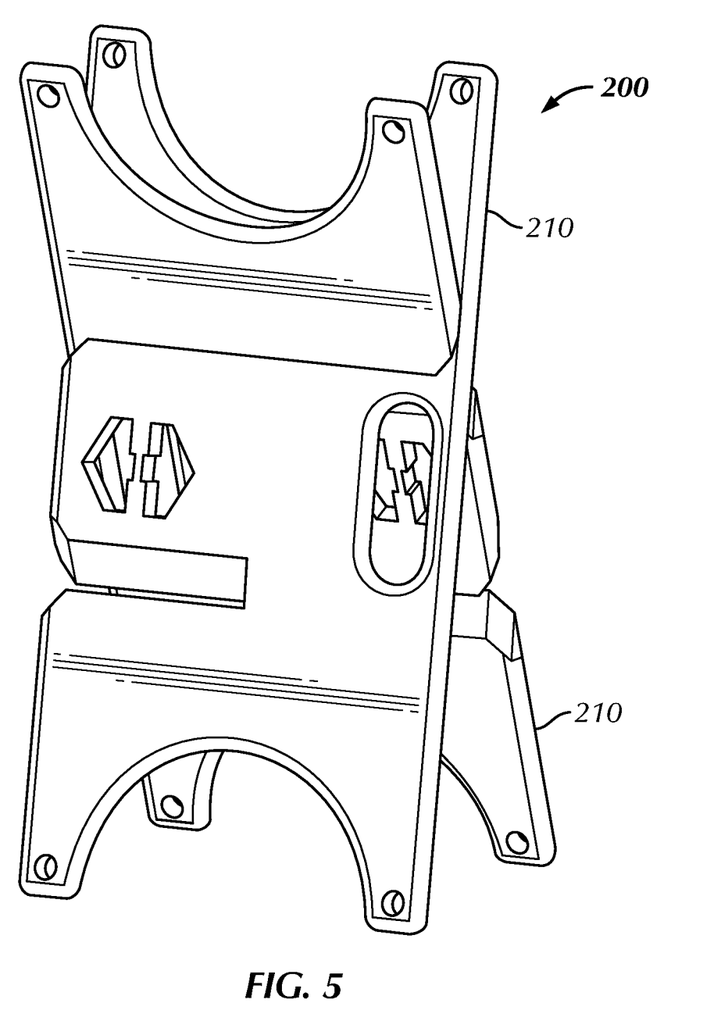
FIG. 5 is a perspective view schematic diagram illustrating an embodiment of an assembled support system comprising two substantially identical panels of the type shown in FIG. 4, under an embodiment.

FIG. 5 is a perspective view schematic diagram illustrating an embodiment of an assembled support system 200 comprising two substantially identical panels 210 of the type shown in FIG. 4, under an embodiment.

Figure 6:
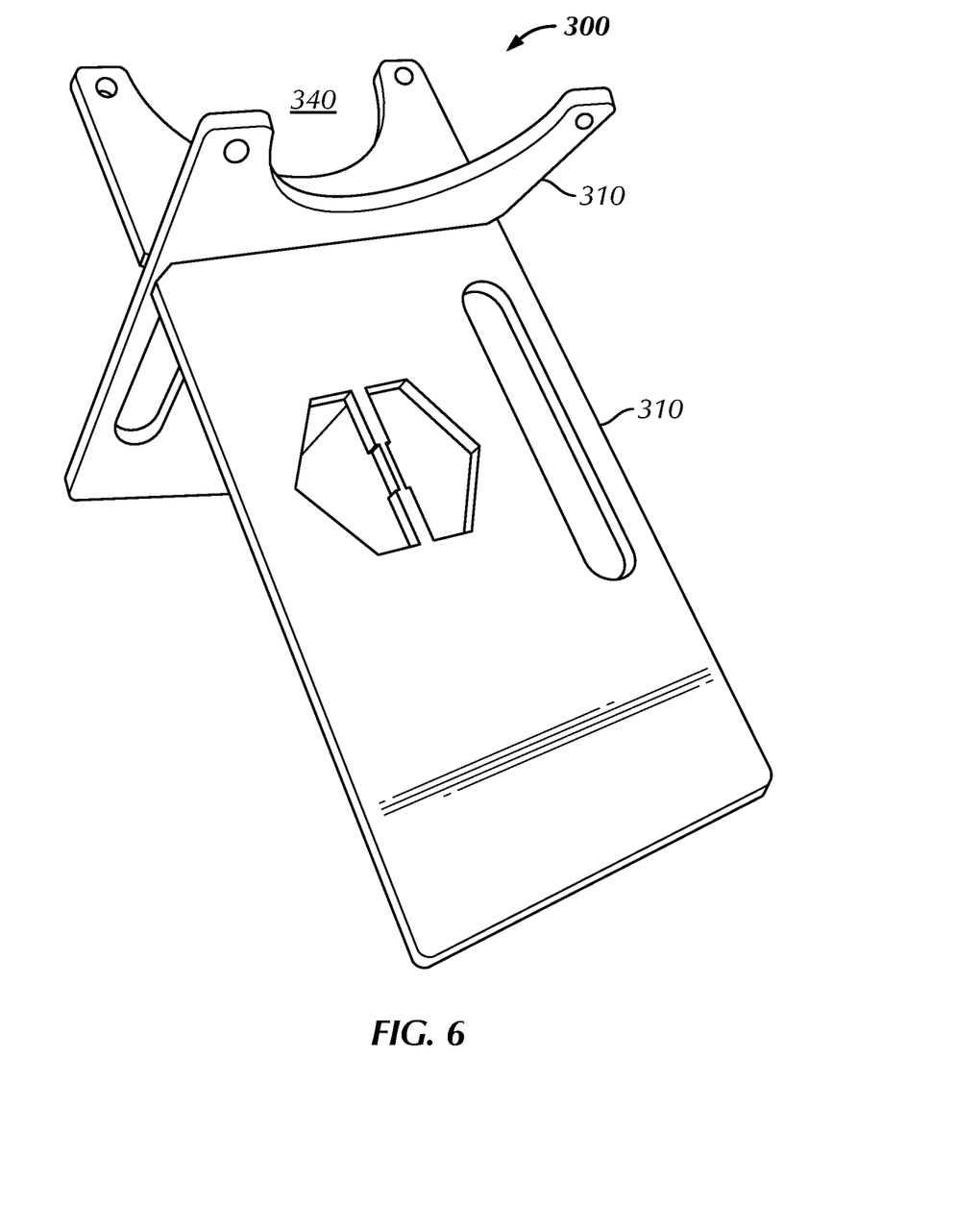
FIG. 6 is a perspective view diagram illustrating an embodiment of an assembled support system comprising two substantially identical panels, each with one slot (see FIG. 9), under an embodiment.

FIG. 6 is a perspective view diagram illustrating an embodiment of an assembled support system 300 comprising two substantially identical panels 310, each of which having one slot 320 (see FIG. 9), under an embodiment.

Figure 7:
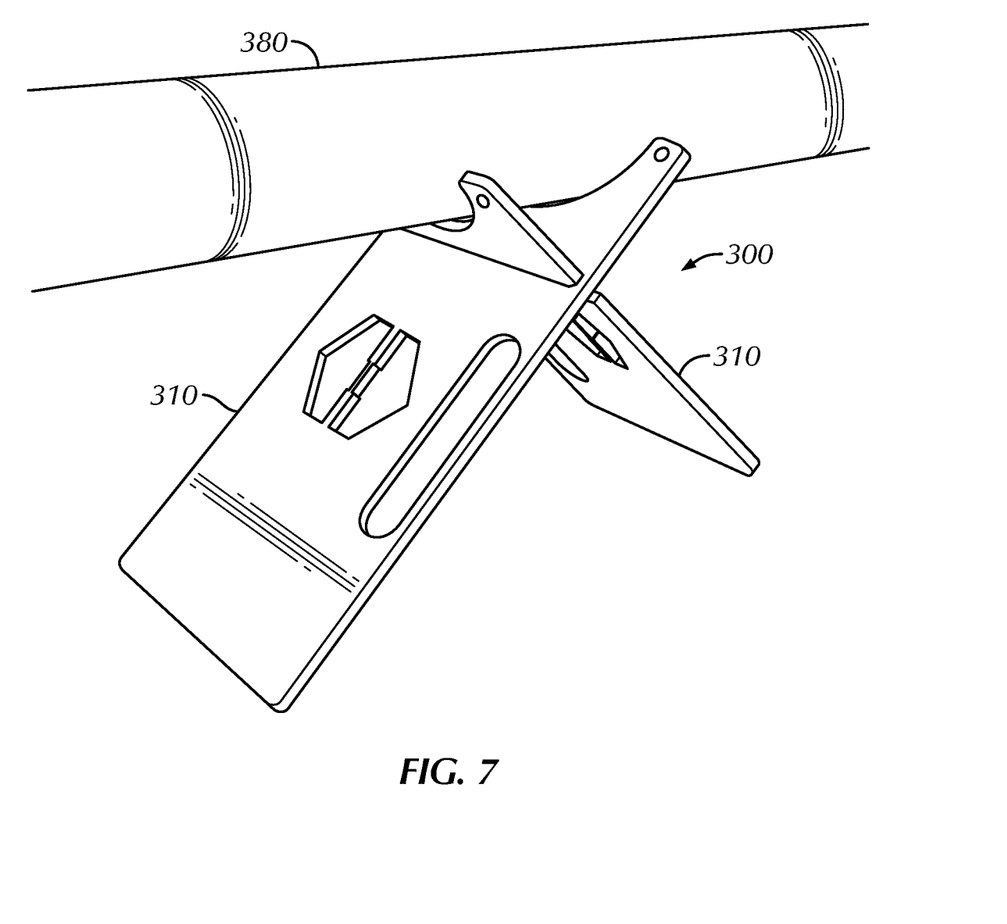
FIG. 7 is a perspective view diagram of the assembled support system shown in FIG. 6 in use supporting a pipe, at least partially, in recesses (see FIG. 6) provided within two panels forming the support system, under an embodiment.

FIG. 7 is a perspective view diagram of the assembled support system 300 shown in FIG. 6 in use supporting a pipe 380, at least partially, in recesses 340 (see FIG. 6) provided within two panels 310 forming the support system 300, under an embodiment.

Figure 8:
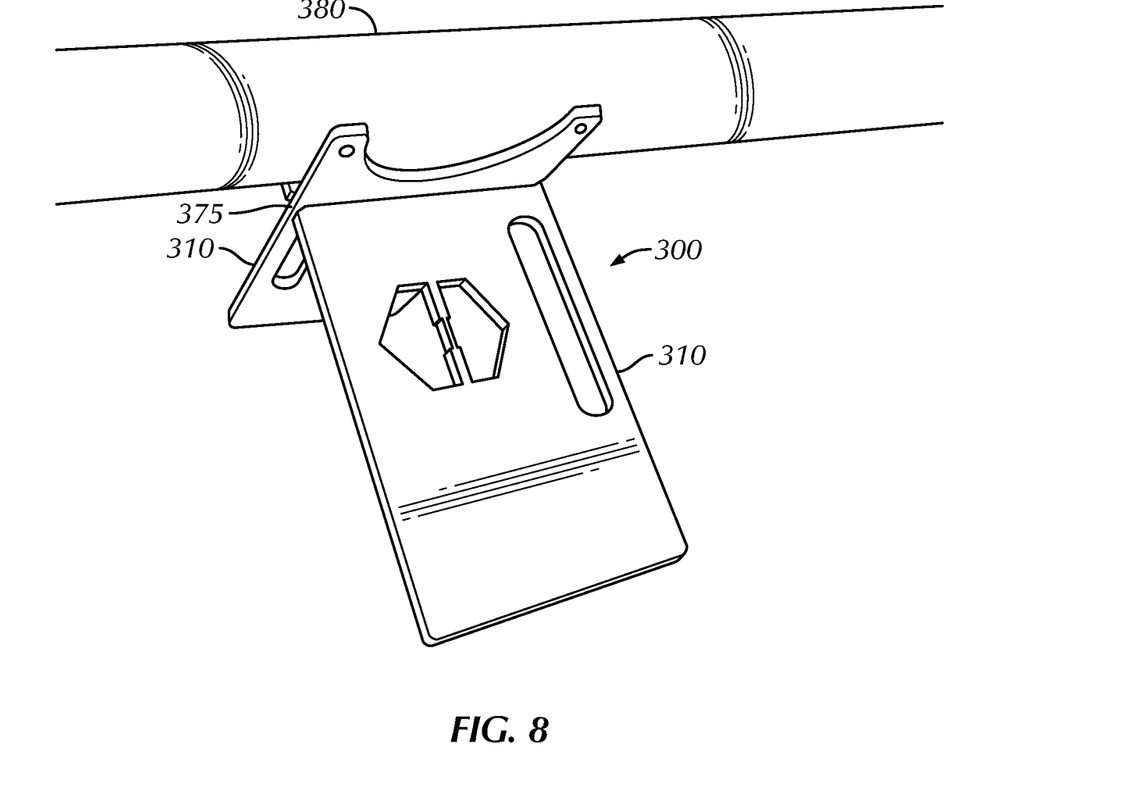
FIG. 8 is a perspective view diagram of the assembled support system shown in FIG. 6 in use supporting a pipe above a linear intersection formed by the first panel mating with the second panel, when the first panel and the second panel are coupled in an X-configuration (X-shaped configuration), under an embodiment.

FIG. 8 is a perspective view diagram of the assembled support system 300 shown in FIG. 6 in use supporting a pipe 380 above a linear intersection 375 formed by the first panel 310 mating with the second panel 310, when the first panel 310 and the second panel 310 are coupled in an X-configuration (X-shaped configuration), under an embodiment.

Figure 9:
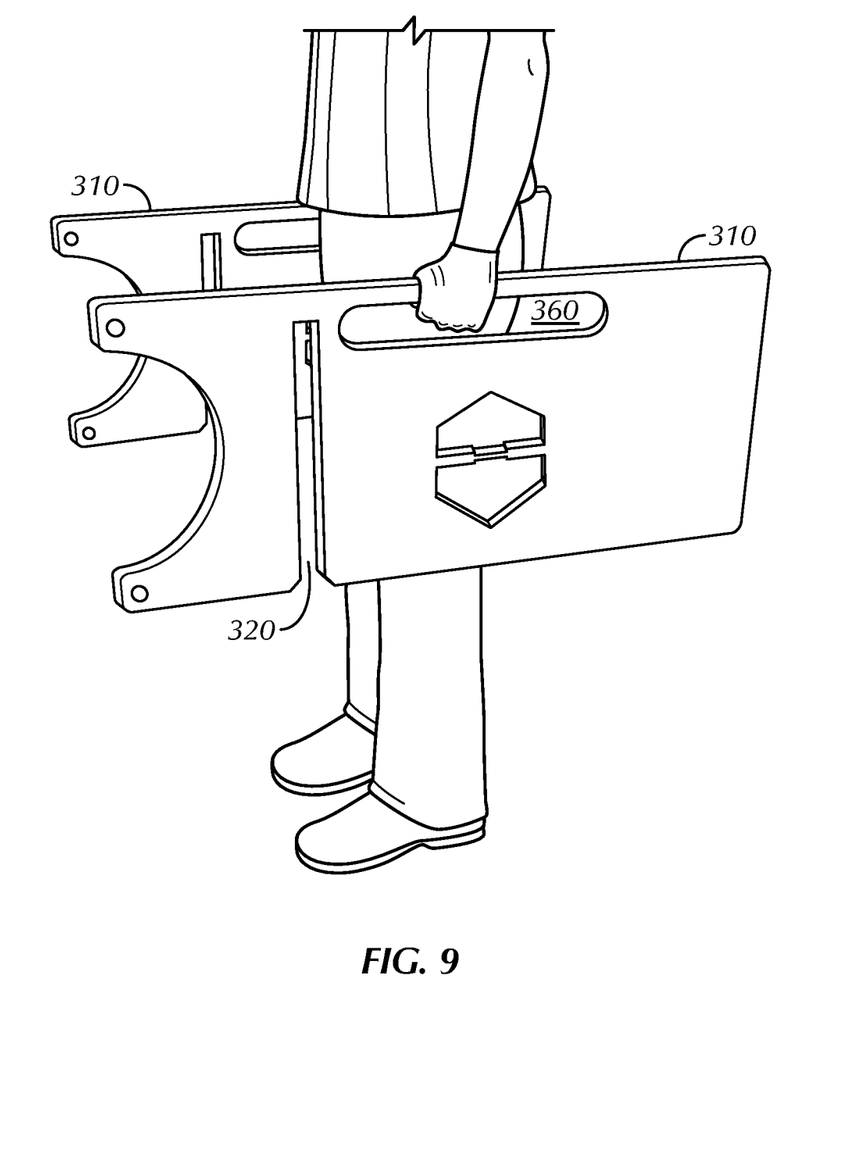
FIG. 9 is a perspective view diagram of two separated substantially identical panels comprising the assembled support system shown in FIG. 6, while being carried by a human via holes, under an embodiment.

FIG. 9 is a perspective view diagram of two separated substantially identical panels 310 comprising the assembled support system 300 shown in FIG. 6, while being carried by a human via holes 360, under an embodiment.

Figure 10:
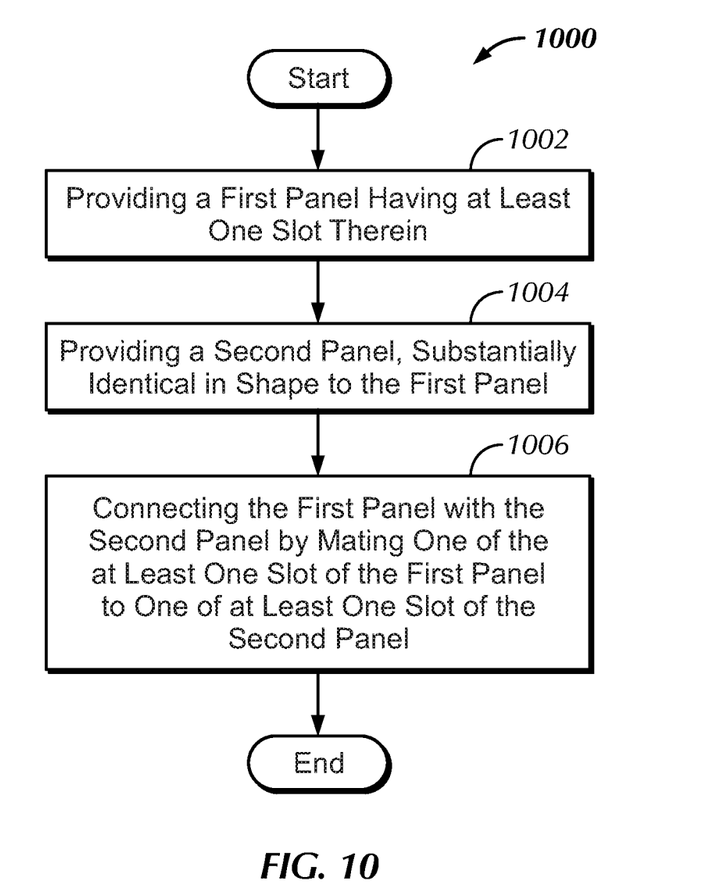
FIG. 10 is a flowchart for using a support system for supporting a pipe, hose, or cable, under an embodiment.

FIG. 10 is a flowchart 1000 for using a support system for supporting a pipe, hose, or cable, under an embodiment. The method 1000 comprises providing a first panel having at least one slot therein (block 1002). The first panel comprises a top edge, a bottom edge opposite the top edge, a first side edge, and a second side edge opposite the first side edge. The at least one slot extends from the first side edge or the second side edge. The method comprises providing a second panel, substantially identical in shape to the first panel (block 1004). The method comprises coupling or coupling the first panel with the second panel by mating one of the at least one slot of the first panel to one of at least one slot of the second panel (block 1006), such that the first panel coupled with the second panel form an X-configuration.

Embodiments include a support system comprising a first panel including a slot. The first panel comprises a top edge, a bottom edge opposite the top edge, a first side edge, and a second side edge opposite the first side edge. The slot extends from at least one of the first side edge and the second side edge. The support system includes a second panel comprising a second slot. The slot and the second slot are configured to removeably align and couple the first panel to the second panel in an X-configuration configured to support a structure aligned with support system in a plurality of alignments.

Embodiments include a support system comprising: a first panel including a slot, wherein the first panel comprises a top edge, a bottom edge opposite the top edge, a first side edge, and a second side edge opposite the first side edge, and wherein the slot extends from at least one of the first side edge and the second side edge; and a second panel comprising a second slot, wherein the slot and the second slot are configured to removeably align and couple the first panel to the second panel in an X-configuration configured to support a structure aligned with support system in a plurality of alignments.

The X-configuration includes a linear intersection formed by the first panel and the second panel, wherein the linear intersection extends in a first direction, wherein the support system is configured to support at least a portion of the structure extending in a first alignment substantially parallel to the first direction.

The X-configuration includes a linear intersection formed by the first panel and the second panel, wherein the support system is configured to support at least a portion of the structure extending in a second alignment substantially perpendicular to the linear intersection.

The top edge of the first panel and a top edge of the second panel comprise recesses configured to adjacently accommodate the at least a portion of the structure.

The recesses include semi-circular recesses comprising a radius of curvature in the range of approximately 2.5 to 4.5 inches.

The structure includes at least one of a pipe, a hose, a cable, and a conduit.

At least one of the slot and the second slot are configured to lock the first panel and the second panel in place and prevent movement of the first panel relative to the second panel in the X-configuration.

The slot of the first panel comprises a top slot surface and a bottom slot surface separated by a slot distance, wherein the second panel has a second panel thickness, and wherein the slot distance is slightly greater than the second panel thickness.

The first panel forms a first angle with the second panel when the first panel and the second panel are coupled in the X-configuration, and wherein the slot of the first panel extends along a depth of the first panel at a second angle.

The second angle is substantially equal to the first angle.

The first angle and the second angle are less than 90 degrees.

The first angle and the second angle are within a range of 13-53 degrees.

The first angle and the second angle are approximately 33 degrees.

The slot of the first panel is formed by a top slot surface having a top slot surface angle that is equal to the second angle, and wherein the second angle is less than 90 degrees.

The slot of the first panel is formed by a bottom slot surface having a bottom slot surface angle that is equal to the second angle, and wherein the second angle is less than 90 degrees.

The slot of the first panel is formed by a bottom slot surface having a bottom slot surface angle that is equal to the second angle, and by a top slot surface having a top slot surface angle that is equal to the second angle, and wherein the second angle is less than 90 degrees.

A length of the slot extends a distance that is substantially half-way across a width of the first panel, and a length of the second slot extends a distance which is substantially half-way across a width of the second panel.

The slot extends in a direction substantially parallel to a surface directly below and adjacent to the bottom edge of the first panel, and the second slot extends in a direction substantially parallel to a surface directly below and adjacent to a bottom edge of the second panel.

The first panel is configured to be reversible such that the top edge may become the bottom edge and the bottom edge may become the top edge.

The first panel includes an additional slot configured parallel to the slot.

The slot is a closest slot to the top edge and is a first distance from the top edge, wherein the additional slot is a closest slot to the bottom edge and is a second distance from the bottom edge, wherein the first distance is different than the second distance.

The first panel forms a linear intersection with the second panel in the X-configuration and a distance from the linear intersection to the bottom edge varies when the first panel is reversed compared to when the first panel is not reversed.

The first panel forms a linear intersection with the second panel in the X-configuration and a distance from the linear intersection to the bottom edge varies when the linear intersection includes the slot compared to when the linear intersection includes the additional slot.

The second panel is substantially identical in shape to the first panel.

Embodiments include a support system comprising a first panel and a second panel each comprising a top edge, a bottom edge opposite the top edge, a first side edge, and a second side edge opposite the first side edge. The support system includes a slot in each of the first panel and the second panel. Each slot extends from at least one of the first side edge and the second side edge of each panel. Each slot is configured to removeably align and couple the first panel and the second panel in an X-configuration configured to support a structure in a plurality of alignments relative to the support system.

Embodiments include a support system comprising: a first panel and a second panel each comprising a top edge, a bottom edge opposite the top edge, a first side edge, and a second side edge opposite the first side edge; and a slot in each of the first panel and the second panel, wherein each slot extends from at least one of the first side edge and the second side edge of each panel, wherein each slot is configured to removeably align and couple the first panel and the second panel in an X-configuration configured to support a structure in a plurality of alignments relative to the support system.

In an embodiment, a support system that supports a pipe, hose, or cable, the support system comprises: a first panel having at least one slot therein, wherein the first panel comprises a top edge, a bottom edge opposite the top edge, a first side edge, and a second side edge opposite the first side edge, and wherein the at least one slot extends from the first side edge or the second side edge; and a second panel configured to couple to the first panel by mating one of the at least one slot of the first panel to one of at least one slot of the second panel; wherein the first panel and the second panel are configured to form an X-configuration when the first panel and the second panel are coupled.

In an embodiment, a length of the at least one slot of the first panel extends a distance which is substantially half-way across a width of the panel.

In an embodiment, the at least one slot of the first panel extends in a direction which is substantially parallel to a surface directly below and adjacent to the bottom edge of the first panel, when the first panel and the second panel are coupled in the X-configuration.

In an embodiment, the at least one slot of the first panel comprise two slots; In an embodiment, the two slots are parallel to each other.

In an embodiment, the two slots extend from one common edge of the first panel; In an embodiment, the two slots extend from opposite edges of the first panel;

In an embodiment, the first panel forms a first angle with the second panel when the first panel and the second panel are coupled in the X-configuration, and wherein the at least one slot of the first panel extends along a depth of the first panel at a second angle.

In an embodiment, the second angle is substantially equal to the first angle.

In an embodiment, the first angle and the second angle are less than 90 degrees.

In an embodiment, the first angle and the second angle are within a range of 13-53 degrees.

In an embodiment, the first angle and the second angle are within a range of 23-43 degrees.

In an embodiment, the first angle and the second angle are approximately 33 degrees.

In an embodiment, the at least one slot of the first panel is formed by a top slot surface having a top slot surface angle which is equal to the second angle, and wherein the second angle is less than 90 degrees.

In an embodiment, the at least one slot of the first panel is formed by a bottom slot surface having a bottom slot surface angle which is equal to the second angle, and wherein the second angle is less than 90 degrees.

In an embodiment, the at least one slot of the first panel is formed by a bottom slot surface having a bottom slot surface angle which is equal to the second angle, and by a top slot surface having a top slot surface angle which is equal to the second angle, and wherein the second angle is less than 90 degrees.

In an embodiment, the at least one slot of the first panel is formed by a top slot surface and a bottom slot surface, wherein the top slot surface and a bottom slot surface are separated by a slot distance, wherein the second panel has a second panel thickness, and wherein the slot distance is slightly greater than the second panel thickness, such that the at least one slot of the first panel locks in place, prevents sagging, and prevents movement of the second panel, when the first panel and the second panel are coupled in the X-configuration.

In an embodiment, the top and bottom edges of the first panel and top and bottom edges of the second panel comprise recesses that are configured to adjacently accommodate at least a portion of a pipe, hose, or cable between the top and bottom edges of the first panel and between the top and bottom edges of the second panel, when the first panel and the second panel are coupled in the X-configuration.

In an embodiment, the recesses are substantially semicircular.

In an embodiment, the recesses each have a radius of curvature in the range of 2.5-4.5 inches.

In an embodiment, the recesses each have a radius of curvature of approximately 3.5 inches.

In an embodiment, the first panel forms a linear intersection with the second panel when the first panel and the second panel are coupled in the X-configuration, wherein the linear intersection extends in a first direction, and wherein the support system is configured to support the pipe, hose, or cable above the linear intersection and while extending in a second direction which is substantially perpendicular to the first direction.

In an embodiment, the first panel forms a linear intersection with the second panel when the first panel and the second panel are coupled in the X-configuration, wherein the linear intersection extends in a first direction, and wherein the support system is configured to support a pipe, hose, or cable above the linear intersection and while extending substantially in the first direction.

In an embodiment, the first panel is configured to be reversible such that the top edge may become the bottom edge and the bottom edge may become the top edge, when the first panel and the second panel are coupled in the X-configuration.

In an embodiment, the first panel forms a linear intersection with the second panel when the first panel and the second panel are coupled in the X-configuration, wherein one of the at least one slot is a closest slot to the top edge and is a first distance from the top edge, wherein another one of the at least one slot is a closest slot to the bottom edge and is a second distance from the bottom edge, and wherein the first distance is different than the second distance, such that a distance from the linear intersection to the bottom edge varies when the first panel is reversed compared to when the first panel is not reversed.

In an embodiment, the first panel forms a linear intersection with the second panel when the first panel and the second panel are coupled in the X-configuration, wherein one of the at least one slot is a closest slot to the top edge and is a first distance from the top edge, wherein another one of the at least one slot is a closest slot to the bottom edge and is a second distance from the bottom edge, and wherein the first distance is different than the second distance, such that a distance from the linear intersection to the bottom edge varies when the linear intersection includes the one of the at least one slot compared to when the linear intersection includes the another one of the at least one slot.

In an embodiment, one of the at least one slot is a closest slot to the top edge and is a first distance from the top edge, wherein another one of the at least one slot is a closest slot to the bottom edge and is a second distance from the bottom edge, and wherein the first distance is different than the second distance.

In an embodiment, the second panel is substantially identical in shape to the first panel. In an embodiment, the first panel has a substantially rectangular shape.

In an embodiment, a support system that supports a pipe, hose, or cable, the support system comprises: a first panel having at least one slot therein, wherein the first panel comprises a top edge, a bottom edge opposite the top edge, a first side edge, and a second side edge opposite the first side edge, and wherein the at least one slot extends from the first side edge or the second side edge; and a second panel having at least one slot therein, wherein the second panel comprises a second panel top edge, a second panel bottom edge opposite the second panel top edge, a second panel first side edge, and a second panel second side edge opposite the second panel first side edge, wherein the at least one second panel slot extends from the second panel first side edge or the second panel second side edge, and wherein the second panel is configured to couple to the first panel by mating one of the at least one slot of the first panel to one of the at least one slot of the second panel; wherein the first panel and the second panel are configured to form an X-configuration when the first panel and the second panel are coupled.

In an embodiment, a method of using a support system for supporting a pipe, hose, or cable, the method comprising: providing a first panel having at least one slot therein, wherein the first panel comprises a top edge, a bottom edge opposite the top edge, a first side edge, and a second side edge opposite the first side edge, and wherein the at least one slot extends from the first side edge or the second side edge; providing a second panel, substantially identical in shape to the first panel; and coupling the first panel with the second panel by mating one of the at least one slot of the first panel to one of at least one slot of the second panel, such that the first panel coupled with the second panel form an X-configuration.

In an embodiment, the method may further comprise aligning the one of the at least one slot of the first panel with the one of at least one slot of the second panel.

In an embodiment, the method may further comprise sliding the first panel into the one of at least one slot of the second panel.

In an embodiment, the method may further comprise sliding the one of the at least one slot of the first panel into the one of at least one slot of the second panel until an end of the one of the at least one slot of the first panel reaches an end of the one of at least one slot of the second panel, whereby the second panel is held by the one of the at least one slot of the first panel and the first panel is held by the one of at least one slot of the second panel.

Although embodiments are described herein with reference to a recess (which may be optional), a hole of any suitable size and shape may alternatively be employed to encompass and support the pipe, hose, or cable therein, and may therefore utilize the advantages of the configurations and embodiments described above.

The figures and descriptions presented herein may have been simplified to illustrate elements that are relevant for a clear understanding of the present invention, while eliminating, for purposes of clarity, other elements found in a typical support system that supports a pipe, hose, or cable, or typical method of using a support system for supporting a pipe, hose, or cable. Those of ordinary skill in the art will recognize that other elements may be desirable and/or required in order to implement the embodiments described herein. However, because such elements may be well known in the art, and because they do not facilitate a better understanding of these embodiments, a discussion of such elements is not provided herein.

Those of ordinary skill in the art will recognize that various modifications and variations may be made to the embodiments described herein without departing from the spirit and scope of the present invention. It is therefore to be understood that the embodiments described herein are not limited to the particular embodiments disclosed above, but are intended to cover such modifications and variations as defined by the following claims. Features in any of the embodiments described herein may be employed in combination with features in other embodiments described above, such combinations are considered to be within the spirit and scope of the claimed invention. The contemplated modifications and variations specifically mentioned herein are considered to be within the spirit and scope of the present invention.

The inventive concepts described herein are not limited in their application to the construction details or component arrangements set forth herein or illustrated in the drawings. It should also be understood that the phraseology and terminology employed herein are merely for descriptive purposes and should not be considered limiting.

It should further be understood that any one of the described features can be used separately or in combination with other features. Other invented devices, systems, methods, features, and advantages will be or become apparent to one with skill in the art upon examining the drawings and the detailed description herein. It is intended that all such additional devices, systems, methods, features, and advantages be protected by the accompanying claims.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the integrated security system and corresponding systems and methods is not intended to be exhaustive or to limit the systems and methods to the precise forms disclosed. While specific embodiments of, and examples for, the integrated security system and corresponding systems and methods are described herein for illustrative purposes, various equivalent modifications are possible within the scope of the systems and methods, as those skilled in the relevant art will recognize. The teachings of the integrated security system and corresponding systems and methods provided herein can be applied to other systems and methods, not only for the systems and methods described above.

The elements and acts of the various embodiments described above can be combined to provide further embodiments. These and other changes can be made to the integrated security system and corresponding systems and methods in light of the above detailed description.

What is claimed is:

1. A support system comprising:
a first panel including a first slot, wherein the first panel comprises a top edge, a bottom edge opposite the top edge, a first side edge, and a second side edge opposite the first side edge, wherein the first slot extends from at least one of the first side edge and the second side edge, wherein the first slot comprises a top slot surface and a bottom slot surface separated by a slot distance; and
a second panel comprising a second slot, wherein the second panel has a second panel thickness, and wherein the slot distance is slightly greater than the second panel thickness, wherein the first slot and the second slot are configured to removeably align and couple the first panel to the second panel in an X-configuration configured to support a structure aligned with support system in a plurality of alignments, wherein at least one of the first slot and the second slot are configured to lock the first panel and the second panel in place and prevent movement of the first panel relative to the second panel in the X-configuration, wherein the first panel forms a first angle with the second panel when the first panel and the second panel are coupled in the X-configuration, and wherein the first slot extends along a depth of the first panel at a second angle, wherein the first angle and the second angle are within a range of 13 to 53 degrees.

2. The support system of claim 1, wherein the X-configuration includes a linear intersection formed by the first panel and the second panel, wherein the linear intersection extends in a first direction, wherein the support system is configured to support at least a portion of the structure extending in a first alignment substantially parallel to the first direction.

3. The support system of claim 1, wherein the X-configuration includes a linear intersection formed by the first panel and the second panel, wherein the support system is configured to support at least a portion of the structure extending in a second alignment substantially perpendicular to the linear intersection.

4. The support system of claim 3, wherein the top edge of the first panel and a top edge of the second panel comprise recesses configured to adjacently accommodate the at least a portion of the structure.

5. The support system of claim 4, wherein the recesses include semi-circular recesses comprising a radius of curvature in at least one of a range of approximately 2.5 to 4.5 inches and up to a full width of at least one of the first panel and the second panel.

6. The support system of claim 1, wherein the structure includes at least one of a pipe, a hose, a cable, a conduit, and a component spanning a non-supported flexible wall.

7. The support system of claim 1, wherein the second angle is substantially equal to the first angle.

8. The support system of claim 1, wherein the first angle and the second angle are at least one of less than 90 degrees and equal to 90 degrees.

9. The support system of claim 1, wherein the first angle and the second angle are approximately 33 degrees.

10. The support system of claim 1, wherein the first slot is formed by a top slot surface having a top slot surface angle which is equal to the second angle, and wherein the second angle is at least one of less than 90 degrees and equal to 90 degrees.

11. The support system of claim 1, wherein the first slot is formed by a bottom slot surface having a bottom slot surface angle which is equal to the second angle, and wherein the second angle is at least one of less than 90 degrees and equal to 90 degrees.

12. The support system of claim 1, wherein the first slot is formed by a bottom slot surface having a bottom slot surface angle which is equal to the second angle, and by a top slot surface having a top slot surface angle which is equal to the second angle, and wherein the second angle is at least one of less than 90 degrees and equal to 90 degrees.

13. The support system of claim 1, wherein a length of the first slot extends a distance which is substantially half-way across a width of the first panel, and a length of the second slot extends a distance which is substantially half-way across a width of the second panel.

14. The support system of claim 1, wherein the first slot extends in a direction substantially parallel to a surface directly below and adjacent to the bottom edge of the first panel, and the second slot extends in a direction substantially parallel to a surface directly below and adjacent to a bottom edge of the second panel.

15. The support system of claim 1, wherein the first panel is configured to be reversible such that the top edge may become the bottom edge and the bottom edge may become the top edge.

16. The support system of claim 15, wherein the first panel includes a third slot configured parallel to the first slot.

17. The support system of claim 16, wherein the first slot is a closest slot to the top edge and is a first distance from the top edge, wherein the third slot is a closest slot to the bottom edge and is a second distance from the bottom edge, wherein the first distance is different than the second distance.

18. The support system of claim 17, wherein the first panel forms a linear intersection with the second panel in the X-configuration and a distance from the linear intersection to the bottom edge varies when the first panel is reversed compared to when the first panel is not reversed.

19. The support system of claim 17, wherein the first panel forms a linear intersection with the second panel in the X-configuration and a distance from the linear intersection to the bottom edge varies when the linear intersection includes the first slot compared to when the linear intersection includes the third slot.

20. The support system of claim 1, wherein the second panel is substantially identical in shape to the first panel.

21. A support system comprising:
a first panel including a first slot, wherein the first panel comprises a top edge, a bottom edge opposite the top edge, a first side edge, and a second side edge opposite the first side edge, wherein the first slot extends from at least one of the first side edge and the second side edge; and
a second panel comprising a second slot, wherein the first slot and the second slot are configured to removeably align and couple the first panel to the second panel in an X-configuration configured to support a structure aligned with support system in a plurality of alignments;
wherein the top edge of the first panel and a top edge of the second panel comprise recesses configured to adjacently accommodate at least a portion of the structure, wherein the recesses include semi-circular recesses comprising a radius of curvature in at least one of a range of approximately 2.5 to 4.5 inches and up to a full width of at least one of the first panel and the second panel.

* * * * *